US007544417B2

(12) United States Patent
Maeda et al.

(10) Patent No.: US 7,544,417 B2
(45) Date of Patent: *Jun. 9, 2009

(54) SOFT MAGNETIC MATERIAL AND DUST CORE COMPRISING INSULATING COATING AND HEAT-RESISTANT COMPOSITE COATING

(75) Inventors: Toru Maeda, Itami (JP); Kazuhiro Hirose, Itami (JP); Haruhisa Toyoda, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 20 days.

This patent is subject to a terminal disclaimer.

(21) Appl. No.: 11/795,463

(22) PCT Filed: Jan. 20, 2006

(86) PCT No.: PCT/JP2006/300826

§ 371 (c)(1), (2), (4) Date: Jul. 17, 2007

(87) PCT Pub. No.: WO2006/077957

PCT Pub. Date: Jul. 27, 2006

(65) Prior Publication Data

US 2008/0152897 A1 Jun. 26, 2008

(30) Foreign Application Priority Data

Jan. 20, 2005 (JP) ............................ 2005-012565

(51) Int. Cl.
*B32B 5/16* (2006.01)

(52) U.S. Cl. ....................... 428/403; 428/212; 428/219; 428/220; 428/407

(58) Field of Classification Search ................. 428/212, 428/219, 220, 323, 328, 403, 407
See application file for complete search history.

(56) References Cited

U.S. PATENT DOCUMENTS 4,246,313 A * 1/1981 Stengle, Jr. ................. 442/136

(Continued)

FOREIGN PATENT DOCUMENTS

JP 60-13826 1/1985

(Continued)

OTHER PUBLICATIONS

International Search Report for PCT/JP2006/300826 mailed Apr. 11, 2006 (English only) (2 pages).

(Continued)

*Primary Examiner*—H. (Holly) T Le
(74) *Attorney, Agent, or Firm*—Osha • Liang LLP

(57) ABSTRACT

A soft magnetic material includes a plurality of composite magnetic particles (30), wherein each of the plurality of composite magnetic particles (30) includes a metal magnetic particle (10), an insulating coating (20) covering the surface of the metal magnetic particle (10), and a composite coating (22) covering the outside of the insulating coating (20). The composite coating (22) includes a heat-resistance-imparting protective coating (24) covering the surface of the insulating coating (20), and a flexible protective coating (26) covering the surface of the heat-resistance-imparting protective coating (24). Accordingly, a soft magnetic material and a dust core which have a satisfactory compactibility and in which the insulating coating satisfactorily functions, thereby sufficiently reducing core loss, can be obtained.

12 Claims, 5 Drawing Sheets

U.S. PATENT DOCUMENTS

| | | | | |
|---|---|---|---|---|
| 4,497,722 | A | 2/1985 | Tsuchida et al. | |
| 5,962,581 | A * | 10/1999 | Hayase et al. | 524/588 |
| 2005/0257854 | A1 * | 11/2005 | Maeda et al. | 148/104 |
| 2006/0159960 | A1 * | 7/2006 | Maeda et al. | 428/692.1 |
| 2007/0194267 | A1 * | 8/2007 | Hirose et al. | 252/62.55 |
| 2007/0235109 | A1 * | 10/2007 | Maeda et al. | 148/307 |
| 2008/0044679 | A1 * | 2/2008 | Maeda et al. | 428/546 |
| 2008/0061264 | A1 * | 3/2008 | Maeda et al. | 252/62.51 R |

FOREIGN PATENT DOCUMENTS

| | | |
|---|---|---|
| JP | 60-41202 | 3/1985 |
| JP | 6-349617 | 12/1994 |
| JP | 7-254522 | 10/1995 |
| JP | 2003-86410 | 3/2003 |
| JP | 2003-142310 | 5/2003 |
| JP | 2003-303711 | 10/2003 |
| JP | 2004-259807 | 9/2004 |
| JP | 2006-5173 | 1/2006 |

OTHER PUBLICATIONS

Patent Abstracts of Japan 2003-303711 dated Oct. 24, 2003 (1 page).
Patent Abstracts of Japan 60-013826 dated Jan. 24, 1985 (1 Page).
Patent Abstracts of Japan 2003-142310 dated May 16, 2003 (1 page).
Patent Abstracts of Japan 06-349617 dated Dec. 22, 1994 (1 page).
Patent Abstracts of Japan 2004-259807 dated Sep. 16, 2004 (1 page).
Patent Abstracts of Japan 60-041202 dated Mar. 4, 1985 (1 page).
Patent Abstracts of Japan 2003-086410, dated Mar. 20, 2003 (1 page).
Patent Abstracts of Japan 07-254522 dated Oct. 3, 1995 (1 page).
Patent Abstracts of Japan 2006-005173 dated Jan. 5, 2006 (1 page).
Office Action dated Jul. 4, 2008 issued by the State Intellectual Property office of the People's Republic of China ,with English translation, 16 pages.

* cited by examiner

SOFT MAGNETIC MATERIAL AND DUST CORE COMPRISING INSULATING COATING AND HEAT-RESISTANT COMPOSITE COATING

TECHNICAL FIELD

The present invention relates to a soft magnetic material and a dust core, and in particular, to a soft magnetic material and a dust core which have a satisfactory compactibility and in which an insulating coating satisfactorily functions, thereby sufficiently reducing core loss.

BACKGROUND ART

Recently, it has been strongly desired for electrical devices including a solenoid valve, a motor, a power supply circuit, or the like to have reduced size, increased efficiency, and increased output. Increasing the operating frequency of these electrical devices is effective in meeting these requirements. The operating frequency of solenoid valves, motors, and the like has been increased on the order of several hundreds of hertz to several kilohertz, and the operating frequency of power supply circuits has been increased on the order of several tens of kilohertz to several hundreds of kilohertz.

Hitherto, electrical devices such as a solenoid valve and a motor are usually operated at a frequency of several hundreds of hertz or lower, and an electrical steel sheet, which is advantageous in that it provides a low core loss, has been used for the material of an iron core of such electrical devices. The core loss of magnetic core materials is broadly divided into hysteresis loss and eddy-current loss. The above-described electrical steel sheet is produced by preparing sheets made of an iron-silicon alloy having a relatively low coercive force, performing an insulation treatment on the surfaces of the sheets, and then laminating the sheets. Such an electrical steel sheet is known as a material particularly having a low hysteresis loss. The eddy-current loss is proportional to the second power of the operating frequency, whereas the hysteresis loss is proportional to the operating frequency. Therefore, when the operating frequency is a band of several hundreds of hertz or lower, the hysteresis loss is dominant. The use of an electrical steel sheet, which particularly has a low hysteresis loss, is effective in this frequency band.

However, since the eddy-current loss is dominant in an operating frequency band of several kilohertz, an alternative material of an iron core replacing the electrical steel sheet is necessary. In such a case, a dust core and a soft ferrite magnetic core, which exhibit relatively satisfactory low-eddy-current loss characteristics, are effectively used. Dust cores are produced using a powdery soft magnetic material such as iron, an iron-silicon alloy, a Sendust alloy, a permalloy, or an iron-based amorphous alloy. More specifically, dust cores are produced as follows: A binder having an excellent insulating property is mixed with the soft magnetic material, or an insulation treatment is performed on the surface of the powder. The material thus prepared is then molded under pressure.

On the other hand, the soft ferrite magnetic core is known as a particularly excellent low-eddy-current loss material because the material itself has a high electric resistance. However, since the use of a soft ferrite decreases the saturation flux density, it is difficult to achieve a high output. The dust core is advantageous from this standpoint because a soft magnetic material having a high saturation flux density is used as a main component.

In a production process of a dust core, pressure molding is performed, and deformation during the pressure molding causes distortion of the powder. Consequently, coercive force is increased, resulting in an increase in the hysteresis loss of the dust core. Therefore, when the dust core is used as the material of an iron core, after a compact is prepared by pressure molding, a process of removing the distortion must be performed.

An effective process of removing such distortion is thermal annealing of the compact. When the temperature during this heat treatment is set to a high value, the effect of distortion removal is increased, thereby reducing the hysteresis loss. However, when the temperature during the heat treatment is set to an excessively high value, an insulating binder or an insulating coating constituting the soft magnetic material is decomposed or degraded, resulting in an increase in the eddy-current loss. Therefore, the heat treatment is inevitably performed only in a temperature range that does not cause such a problem. Accordingly, improving heat resistance of the insulating binder or the insulating coating constituting the soft magnetic material is important in order to decrease the core loss of the dust core.

A known typical dust core is produced by adding about 0.05 to 0.5 mass percent of a resin to a pure iron powder having a phosphate coating serving as an insulating coating, molding the powder under heating, and then performing thermal annealing for removing distortion. In this example, the temperature during the heat treatment is in the range of about 200° C. to 500° C., which is the thermal decomposition temperature of the insulating coating. In this case, however, the temperature during the heat treatment is low, and thus, a satisfactory effect of distortion removal cannot be achieved.

Japanese Unexamined Patent Application Publication No. 2003-303711 (Patent Reference 1) discloses an iron-based powder having a heat-resistant insulating coating with which insulation is not broken during annealing for reducing hysteresis loss, and a dust core including the iron-based powder. In the iron-based powder disclosed in Patent Reference 1, the surface of the powder containing iron as a main component is covered with a coating containing a silicone resin and a pigment. More preferably, a coating containing a silicon compound or the like is provided as an underlayer of the coating containing a silicone resin and a pigment. The pigment is preferably a powder having an average particle diameter, which is specified as D50, of 40 nm or less.

Patent Reference 1: Japanese Unexamined Patent Application Publication No. 2003-303711

DISCLOSURE OF INVENTION

Problems to be Solved by the Invention

As described above, the heat-resistant insulating coating disclosed in Patent Reference 1 contains a pigment. The pigment is usually composed of a hard material such as a metal oxide. Accordingly, when a dust core is prepared by molding the iron-based powder disclosed in Patent Reference 1 under pressure, the heat-resistant insulating coating is locally broken by the pressure applied during the pressure molding. As a result, although heat resistance of the insulating coating is improved, the electric resistance itself is decreased. Accordingly, eddy currents readily flow between the iron-based particles, resulting in the problem of an increase in the core loss of the dust core due to an eddy-current loss. That is, although the pigment has an effect of improving heat resistance, the pigment somewhat damages the heat-resistant insulating coating during the pressure molding, thereby increasing fundamental eddy loss at the heat-resistant temperature or lower.

Accordingly, it is an object of the present invention to solve the above problem and to provide a soft magnetic material and a dust core which have a satisfactory compactibility and in which an insulating coating satisfactorily functions, thereby sufficiently reducing core loss.

Means for Solving the Problems

A soft magnetic material according to a first aspect of the present invention includes a plurality of composite magnetic particles, wherein each of the plurality of composite magnetic particles includes a metal magnetic particle, an insulating coating covering the surface of the metal magnetic particle, and a composite coating covering the outside of the insulating coating. The composite coating includes a heat-resistance-imparting protective coating covering the surface of the insulating coating, and a flexible protective coating covering the surface of the heat-resistance-imparting protective coating.

A soft magnetic material according to a second aspect of the present invention includes a plurality of composite magnetic particles, wherein each of the plurality of composite magnetic particles includes a metal magnetic particle, an insulating coating covering the surface of the metal magnetic particle, and a composite coating covering the surface of the insulating coating. The composite coating is a mixed coating including a heat-resistance-imparting protective coating and a flexible protective coating. On the surface of the composite coating, the content of the flexible protective coating is higher than the content of the heat-resistance-imparting protective coating, and in the composite coating located at the boundary with the insulating coating, the content of the heat-resistance-imparting protective coating is higher than the content of the flexible protective coating.

According to the soft magnetic material in the first aspect and the second aspect of the present invention, since the surfaces of the composite magnetic particles are covered with the flexible protective coating having a predetermined flexibility, a satisfactory compactibility can be provided. Furthermore, even when the flexible protective coating receives a pressure, cracks are not readily formed on the flexible protective coating because of its flexible property. Accordingly, the presence of the flexible protective coating can prevent the phenomenon in which the heat-resistance-imparting protective coating and the insulating coating are broken by a pressure applied during pressure molding. Consequently, the insulating coating can satisfactorily function, thereby sufficiently reducing eddy currents flowing between the particles.

Furthermore, since the insulating coating is protected by the heat-resistance-imparting protective coating, heat resistance of the insulating coating is improved. Therefore, even when a heat treatment is performed at a high temperature, the insulating coating is not readily broken. Accordingly, the hysteresis loss can be reduced by the high-temperature heat treatment.

In the soft magnetic material according to the present invention, the insulating coating preferably contains at least one compound selected from the group consisting of a phosphorus compound, a silicon compound, a zirconium compound, and an aluminum compound.

These materials have an excellent insulating property, and therefore, eddy currents flowing between the metal magnetic particles can be more effectively reduced.

In the soft magnetic material according to the present invention, the average thickness of the insulating coating is preferably in the range of 10 nm to 1 μm.

When the average thickness of the insulating coating is 10 nm or more, tunneling currents flowing in the insulating coating can be reduced, and an increase in the eddy-current loss due to the tunneling currents can be prevented. When the average thickness of the insulating coating is 1 μm or less, generation of the demagnetizing field due to an excessively large distance between the metal magnetic particles (occurrence of an energy loss due to a magnetic pole generated in the metal magnetic particles) can be prevented. Accordingly, an increase in the hysteresis loss due to the generation of the demagnetizing field can be suppressed. Furthermore, the above average thickness of the insulating coating can prevent the phenomenon in which the volume ratio of the insulating coating in the soft magnetic material becomes excessively small, thereby decreasing the saturation flux density of a compact made of the soft magnetic material.

In the soft magnetic material according to the present invention, preferably, the heat-resistance-imparting protective coating contains an organic silicon compound, and the siloxane crosslinking density of the organic silicon compound is more than 0 and not more than 1.5.

As regards an organic silicon compound having a siloxane crosslinking density of more than 0 and not more than 1.5, the compound itself has excellent heat resistance, and in addition, the Si content in the compound is high even after thermal decomposition. Therefore, when such a compound is changed to a Si—O compound, the degree of shrinkage is small and the electric resistance is not markedly decreased. Accordingly, such an organic silicon compound is suitable for the heat-resistance-imparting protective coating. More preferably, the siloxane crosslinking density (R/Si) is not more than 1.3.

In the soft magnetic material according to the present invention, preferably, the flexible protective coating contains a silicone resin, and the Si (silicon) content of the composite coating located at the boundary with the insulating coating is higher than the Si content on the surface of the composite coating.

The Si content in the heat-resistance-imparting protective coating is higher than the Si content in the flexible protective coating. Therefore, the composite coating has a structure in which the flexible protective coating is localized on the surface thereof. Accordingly, the presence of the flexible protective coating can prevent the phenomenon in which the heat-resistance-imparting protective coating and the insulating coating are broken by a pressure applied during pressure molding. Consequently, the insulating coating can satisfactorily function, thereby sufficiently reducing eddy currents flowing between the particles.

In the soft magnetic material according to the present invention, the flexible protective coating preferably contains at least one resin selected from the group consisting of a silicone resin, an epoxy resin, a phenolic resin, and an amide resin.

These materials have excellent flexibility, and therefore, breaking of the heat-resistance-imparting protective coating and the insulating coating can be effectively prevented.

In the soft magnetic material according to the present invention, the average thickness of the composite coating is preferably in the range of 10 nm to 1 μm.

When the average thickness of the composite coating is 10 nm or more, breaking of the insulating coating can be effectively prevented. When the average thickness of the composite coating is 1 μm or less, generation of the demagnetizing field due to an excessively large distance between the metal magnetic particles (occurrence of an energy loss due to a magnetic pole generated in the metal magnetic particles) can be prevented. Accordingly, an increase in the hysteresis loss due to the generation of the demagnetizing field can be suppressed. Furthermore, the above average thickness of the composite coating can prevent the phenomenon in which the volume ratio of the composite coating in the soft magnetic material becomes excessively small, thereby decreasing the saturation flux density of a compact made of the soft magnetic material.

A dust core according to the present invention is produced using any one of the above-described soft magnetic materials. Accordingly, a dust core which has a high compact density and in which the insulating coating satisfactorily functions, thereby sufficiently reducing the core loss can be obtained.

In the dust core according to the present invention, the Si content of the composite coating located at the boundary with the insulating coating is preferably higher than the Si content on the surface of the composite coating.

Therefore, the composite coating has a structure in which the flexible protective coating is localized on the surface thereof. Accordingly, the presence of the flexible protective coating can prevent the phenomenon in which the heat-resistance-imparting protective coating and the insulating coating are broken by a pressure applied during pressure molding. Consequently, the insulating coating can satisfactorily function, thereby sufficiently reducing the core loss.

Advantages of the Invention

According to the soft magnetic material and the dust core of the present invention, the compactibility is satisfactory, and an insulating coating can satisfactorily function, thereby sufficiently reducing the core loss.

REFERENCE NUMERALS

| | |
|---|---|
| 10 | metal magnetic particle |
| 20 | insulating coating |
| 22, 22a | composite coating |
| 24 | heat-resistance-imparting protective coating |
| 26 | flexible protective coating |
| 30, 30a | composite magnetic particle |

Best Mode for Carrying Out the Invention

Embodiments of the present invention will now be described with reference to the drawings.

First Embodiment

Figure 1A:
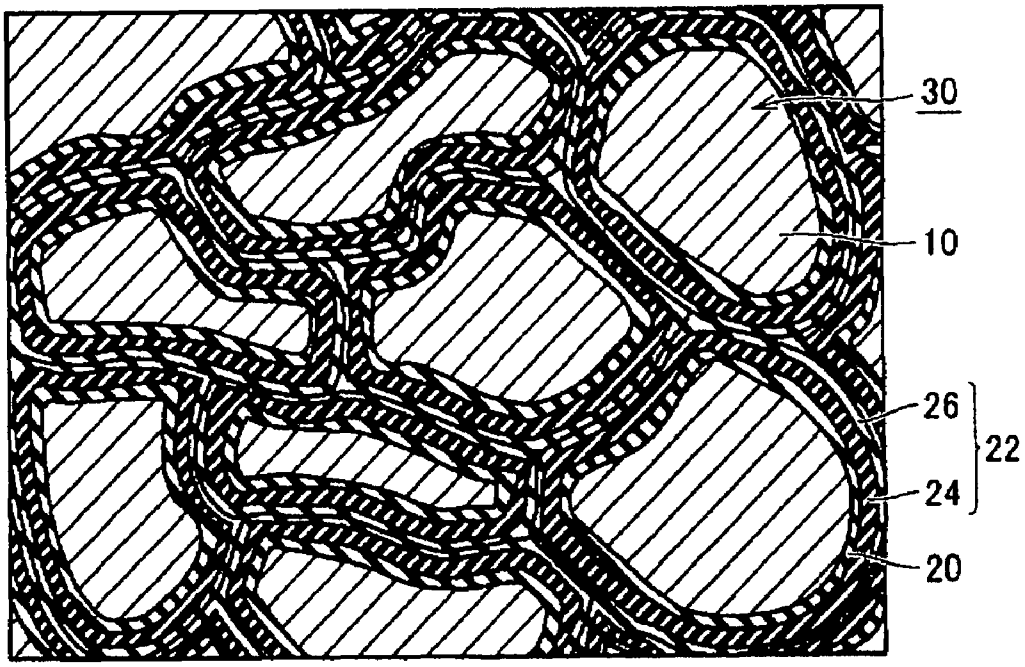
FIG. 1A is an enlarged schematic view showing a dust core according to a first embodiment of the present invention.
Figure 1B:
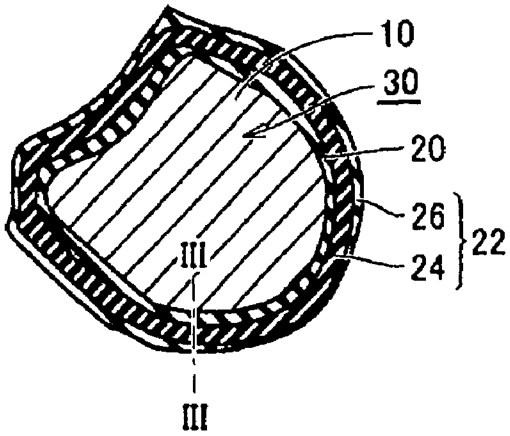
FIG. 1B is an enlarged view showing a single composite magnetic particle shown in FIG. 1A.

FIG. 1A is an enlarged schematic view showing a dust core according to a first embodiment of the present invention. FIG. 1B is an enlarged view showing a single composite magnetic particle shown in FIG. 1A. Referring to FIGS. 1A and 1B, a soft magnetic material of this embodiment includes a plurality of composite magnetic particles 30. The plurality of composite magnetic particles 30 are bonded to each other, for example, by engagement of irregularities of the composite magnetic particles 30 or by an organic substance (not shown in the drawings) that is present between the composite magnetic particles 30. Each of the composite magnetic particles 30 includes a metal magnetic particle 10, an insulating coating 20, and a composite coating 22. The insulating coating 20 is provided so as to cover the surface of the metal magnetic particle 10, and the composite coating 22 is provided so as to cover the surface of the insulating coating 20.

The metal magnetic particles 10 are made of a material having a high saturation flux density and a low coercive force as magnetic properties. Examples of the material include iron (Fe), iron (Fe)-silicon (Si) alloys, iron (Fe)-aluminum (Al) alloys, iron (Fe)-chromium (Cr) alloys (such as electromagnetic stainless steels), iron (Fe)-nitrogen (N) alloys, iron (Fe)-nickel (Ni) alloys (such as permalloys), iron (Fe)-carbon (C) alloys, iron (Fe)-boron (B) alloys, iron (Fe)-cobalt (Co) alloys, iron (Fe)-phosphorus (P) alloys, iron (Fe)-nickel (Ni)-cobalt (Co) alloys, and iron (Fe)-aluminum (Al)-silicon (Si) alloys (such as Sendust alloys). Among these, in particular, pure iron particles, iron-silicon (more than 0 mass percent to 6.5 mass percent or less) alloy particles, iron-aluminum (more than 0 mass percent to 5 mass percent or less) alloy particles, permalloy particles, electromagnetic stainless alloy particles, Sendust alloy particles, iron-based amorphous alloy particles, or the like are preferably used as the metal magnetic particles 10.

The average particle diameter of the metal magnetic particles 10 is preferably in the range of 5 to 300 μm. When the average particle diameter of the metal magnetic particles 10 is 5 μm or more, the metal magnetic particles 10 are not readily oxidized, and thus magnetic properties of the dust core can be improved. When the average particle diameter of the metal magnetic particles 10 is 300 μm or less, the compressibility of the powder is not degraded during pressured molding. Accordingly, the density of a compact prepared by the pressure molding can be increased.

The average particle diameter mentioned here means a particle diameter of a particle at which the cumulative sum of the masses of particles determined by adding the masses of particles starting from the smallest particle diameter reaches 50% in a histogram of particle diameters measured by means of a laser diffraction/scattering method, that is, a 50% cumulative mass average particle diameter D.

The insulating coating 20 is made of a material having at least an electrical insulating property, for example, a phosphorus compound, a silicon compound, a zirconium compound, or an aluminum compound. Specific examples of such a compound include iron phosphate containing phosphorus and iron, manganese phosphate, zinc phosphate, calcium phosphate, silicon oxide, titanium oxide, aluminum oxide, and zirconium oxide.

This insulating coating 20 functions as an insulating layer disposed between the metal magnetic particles 10. By coating the metal magnetic particles 10 with the insulating coating 20, the electrical resistivity ρ of the dust core can be increased. Accordingly, the flow of eddy currents between the metal magnetic particles 10 can be suppressed, thereby reducing the core loss of the dust core due to the eddy-current loss.

Examples of a method of forming the insulating coating 20 made of a phosphorus compound on the metal magnetic particles 10 include a wet coating process using a solution prepared by dissolving a metal phosphate or a phosphate ester in water or an organic solvent. Examples of a method of forming the insulating coating 20 made of a silicon compound on the metal magnetic particles 10 include a method of coating a silicon compound such as a silane coupling agent, a silicone resin, or a silazane by a wet process, and a method of coating a silicate glass or a silicon oxide by a sol-gel process.

Examples of a method of forming the insulating coating 20 made of a zirconium compound on the metal magnetic particles 10 include a method of coating a zirconium coupling agent by a wet process, and a method of coating zirconium oxide by a sol-gel process. Examples of a method of forming the insulating coating 20 made of an aluminum compound on the metal magnetic particles 10 include a method of coating aluminum oxide by a sol-gel process. The method of forming the insulating coating 20 is not limited to the above-described methods, and various methods suitable for the insulating coating 20 to be formed can be employed.

The average thickness of the insulating coating 20 is preferably in the range of 10 nm to 1 μm. In such a case, an increase in the eddy-current loss due to tunneling currents can be prevented, and an increase in the hysteresis loss due to a demagnetizing field generated between the metal magnetic particles 10 can be prevented. The average thickness of the insulating coating 20 is more preferably 500 nm or less, and still more preferably 200 nm or less.

The average thickness mentioned here is determined by deriving an equivalent thickness by taking into account the film composition determined by composition analysis (transmission electron microscopy-energy dispersive X-ray spectroscopy (TEM-EDX)) and the amounts of elements determined by inductively coupled plasma-mass spectrometry (ICP-MS), by directly observing the coating using a TEM image, and confirming that the order of magnitude of the equivalent thickness derived above is a proper value.

The composite coating 22 includes a heat-resistance-imparting protective coating 24 and a flexible protective coating 26. The heat-resistance-imparting protective coating 24 is provided so as to cover the surface of the insulating coating 20, and the flexible protective coating 26 is provided so as to cover the surface of the heat-resistance-imparting protective coating 24. More specifically, the composite coating 22 of this embodiment has a two-layer structure in which the heat-resistance-imparting protective coating 24 is adjacent to the interface with the insulating coating 20 and the flexible protective coating 26 is provided adjacent to the surface of the composite magnetic particle 30.

The average thickness of the composite coating 22 is preferably in the range of 10 nm to 1 μm. In such a case, breaking of the insulating coating 20 can be effectively suppressed, and an increase in the hysteresis loss due to a demagnetizing field generated between the metal magnetic particles 10 can be prevented.

The heat-resistance-imparting protective coating 24 has a function of preventing the insulating coating 20, i.e., an underlayer, from being thermally decomposed by heating during heat treatment. The heat-resistance-imparting protective coating 24 is made of a material which contains an organic silicon compound and in which the siloxane crosslinking density (R/Si) is more than 0 and not more than 1.5. For example, a silicone resin in which the siloxane crosslinking density (R/Si) is within the above range can be used as the heat-resistance-imparting protective coating 24. More preferably, the siloxane crosslinking density (R/Si) is not more than 1.3.

Herein, the siloxane crosslinking density (R/Si) is a numerical value representing the average number of organic groups bonded to a single Si atom. A smaller siloxane crosslinking density means a higher degree of crosslinking and a higher Si content.

The flexible protective coating 26 has a function of preventing the heat-resistance-imparting protective coating 24 and the insulating coating 20, which are underlayers, from being broken during the pressure molding. The flexible protective coating 26 is made of a material having a predetermined flexibility. More specifically, the flexible protective coating 26 is made of a material wherein when a flexibility test specified by Japanese Industrial Standards (JIS) is performed using a round bar with a diameter of 6 mm at room temperature, cracks are not formed on the coating and the coating is not separated from a metal plate.

The flexibility test specified by JIS is performed as follows. For an air-drying varnish, a test piece having the varnish coating is left to stand indoors for 24 hours. For a baking varnish, a test piece having the varnish coating is additionally heated at a predetermined temperature for a predetermined time and then left to cool at room temperature. Subsequently, a metal plate test piece is maintained in water at 25° C.±5° C. for about two minutes. In this state, the test piece is then bent by 180 degrees around a round bar having a predetermined diameter within about three seconds so that the coating is disposed on the outside. The presence or absence of cracks on the coating and separation of the coating from the metal plate are visually checked.

The flexible protective coating 26 is made of, for example, a silicone resin having a siloxane crosslinking density (R/Si) of more than 1.5. Alternatively, the flexible protective coating 26 may be made of an epoxy resin, a phenolic resin, an amide resin, or the like.

Figure 2:
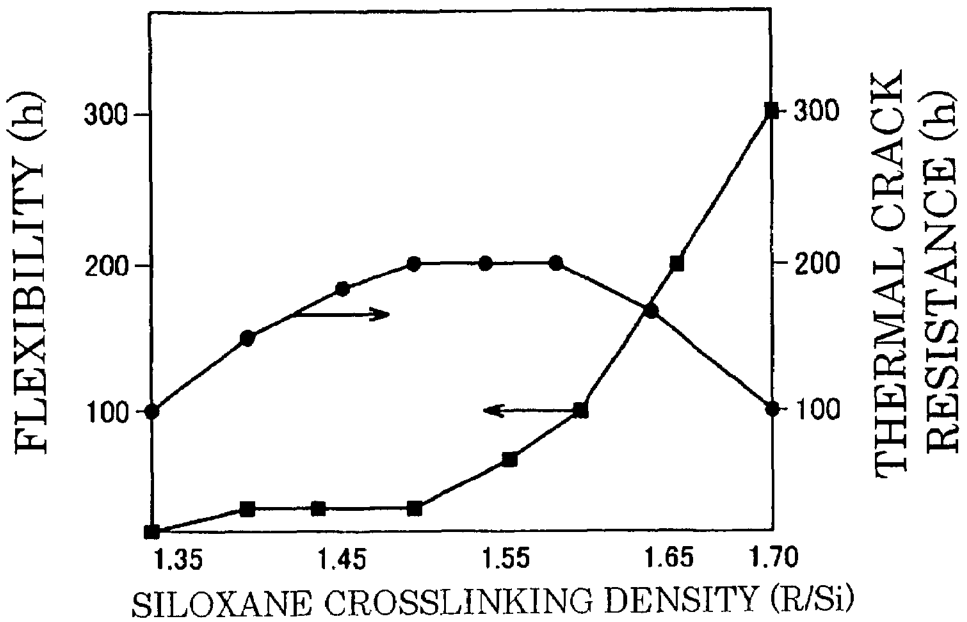
FIG. 2 is a graph showing the relationships between the siloxane crosslinking density (R/Si) of an organic silicon compound (a silicone resin) and the thermal crack resistance, and between the siloxane crosslinking density (R/Si) and the flexibility.

FIG. 2 is a graph showing the relationships between the siloxane crosslinking density (R/Si) of an organic silicon compound (silicone resin) and the thermal crack resistance, and between the siloxane crosslinking density (R/Si) and the flexibility. The thermal crack resistance is a value represented by the time required for the onset of crack formation when the organic silicon compound is heated at 280° C. Regarding the flexibility, the bending diameter in the test is 3 mm.

As shown in FIG. 2, when the siloxane crosslinking density (R/Si) is not more than 1.5, the silicone resin has a satisfactory thermal crack resistance. This result shows that a silicone resin having a siloxane crosslinking density (R/Si) of more than 0 and not more than 1.5 is suitable for use in the heat-resistance-imparting protective coating 24. More preferably, the siloxane crosslinking density (R/Si) is not more than 1.3. On the other hand, the flexibility of the silicone resin is improved in the range where the siloxane crosslinking density (R/Si) exceeds 1.5. This result shows that a silicone resin having a siloxane crosslinking density (R/Si) of more than 1.5 is suitable for use in the flexible protective coating 26.

Figure 3:
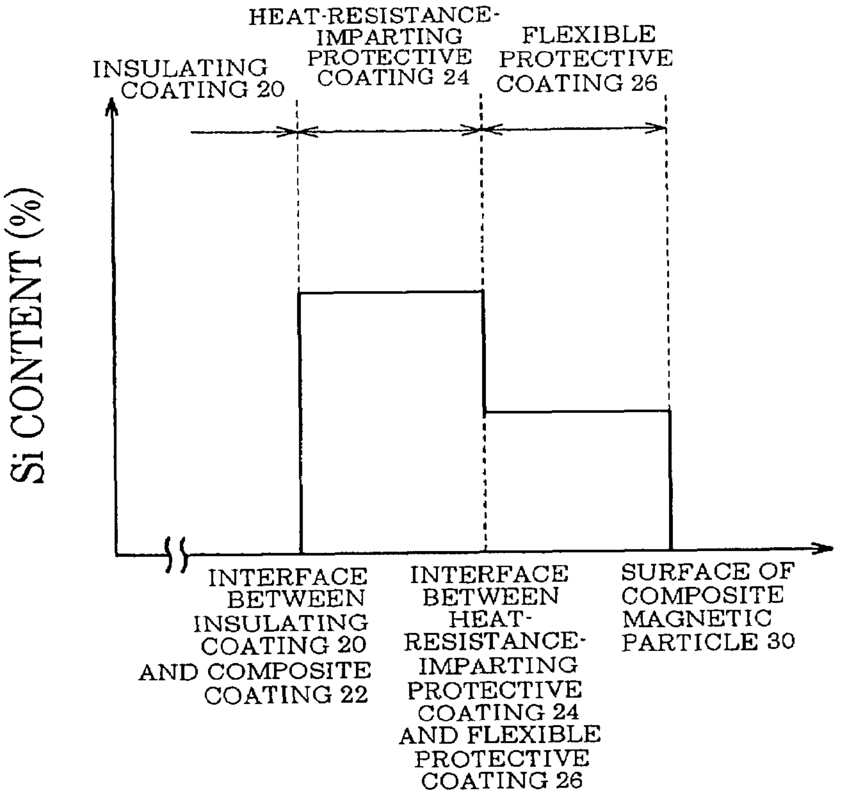
FIG. 3 is a graph showing the Si content along line III-III in a composite coating of the composite magnetic particle shown in FIG. 1B.

In the composite magnetic particle 30 shown in FIGS. 1A and 1B, the Si content in the composite coating 22 is shown in FIG. 3.

FIG. 3 is a graph showing the Si content along line III-III in the composite coating of the composite magnetic particle shown in FIG. 1B. Referring to FIG. 3, since the siloxane crosslinking density (R/Si) of the silicone resin constituting the flexible protective coating 26 is higher than the siloxane crosslinking density (R/Si) of the silicone resin constituting the heat-resistance-imparting protective coating 24, the Si content of the heat-resistance-imparting protective coating 24 is higher than the Si content of the flexible protective coating 26. That is, the Si content in the composite coating 22 at the boundary with the insulating coating 20 is higher than the Si content on the surface of the composite coating 22 (composite magnetic particle 30).

An example of a method of forming the heat-resistance-imparting protective coating 24 on the surface of the insulating coating 20 is a method of immersing the metal magnetic particles 10 having the insulating coating 20 in an organic solvent in which a component of the heat-resistance-imparting protective coating 24 is dissolved and stirring the mixture, vaporizing the organic solvent, and then curing the heat-resistance-imparting protective coating 24 (wet coating process). Similarly, this wet coating process can also be employed as a method of forming the flexible protective coating 26 on the surface of the heat-resistance-imparting protective coating 24.

A method of producing the dust core shown in FIG. 1A will now be described. First, the insulating coating 20 is formed on the surfaces of the metal magnetic particles 10, the heat-resistance-imparting protective coating 24 is formed on the surface of the insulating coating 20, and the flexible protective coating 26 is formed on the surface of the heat-resistance-imparting protective coating 24. The composite magnetic particles 30 are prepared by the above steps.

Subsequently, the composite magnetic particles 30 are supplied in a die and subjected to pressure molding under a pressure, for example, in the range of 700 to 1,500 MPa. Accordingly, the composite magnetic particles 30 are compressed to prepare a compact. The pressure molding may be performed in air. However, the atmosphere during the pressure molding is preferably an inert gas atmosphere or a reduced pressure atmosphere. In this case, oxidation of the composite magnetic particles 30 by oxygen in air can be suppressed.

In this case, since the flexible protective coating 26 has a predetermined flexibility, the soft magnetic material has a satisfactory compactability. Furthermore, on receiving a pressure during the pressure molding, the shape of the flexible protective coating 26 is flexibly changed. Therefore, cracks are not readily formed on the flexible protective coating 26. Accordingly, the presence of the flexible protective coating 26 can prevent the phenomenon in which the heat-resistance-imparting protective coating 24 and the insulating coating 20 are broken by the pressure applied during the pressure molding.

The compact prepared by the pressure molding is then heat-treated at a temperature of, for example, 500° C. or higher and lower than 800° C., thereby removing distortion and dislocation caused inside the compact. The heat treatment may be performed in air. However, the atmosphere during the heat treatment is preferably an inert gas atmosphere or a reduced pressure atmosphere. In this case, oxidation of the composite magnetic particles 30 by oxygen in air can be suppressed.

In this case, since the heat-resistance-imparting protective coating 24 has a high heat resistance, the heat-resistance-imparting protective coating 24 functions as a protective film that protects the insulating coating 20 from heat. Therefore, although the heat treatment is performed at a high temperature of 500° C. or higher, the insulating coating 20 is not degraded. Accordingly, the hysteresis loss can be reduced by the high-temperature heat treatment.

After the heat treatment, the compact is subjected to an appropriate process, such as cutting, as required, thus completing the dust core shown in FIG. 1A.

According to the soft magnetic material of this embodiment, since the flexible protective coating 26 having a predetermined flexibility covers the surfaces of the composite magnetic particles 30, a satisfactory compactibility can be provided. In addition, the flexible property of the flexible protective coating 26 can prevent the phenomenon in which the heat-resistance-imparting protective coating 24 and the insulating coating 20 are broken by a pressure applied during the pressure molding. Accordingly, the insulating coating 20 can satisfactorily function, thereby sufficiently reducing eddy currents flowing between the particles.

Furthermore, since the insulating coating 20 is protected by the heat-resistance-imparting protective coating 24, heat resistance of the insulating coating 20 is improved. Consequently, even when a heat treatment is performed at a high temperature, the insulating coating 20 is not readily broken. Accordingly, the hysteresis loss can be reduced by the high-temperature heat treatment.

Second Embodiment

Figure 4A:
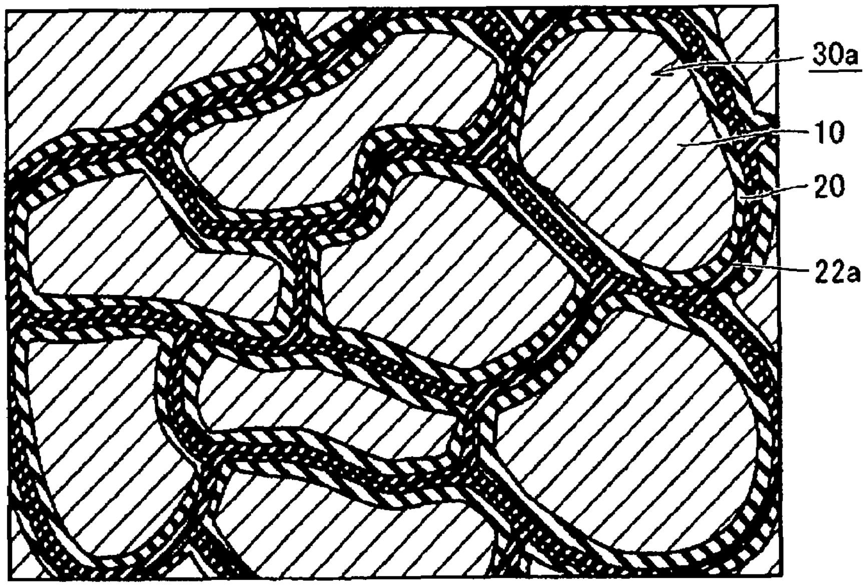
FIG. 4A is an enlarged schematic view showing a dust core according to a second embodiment of the present invention.
Figure 4B:
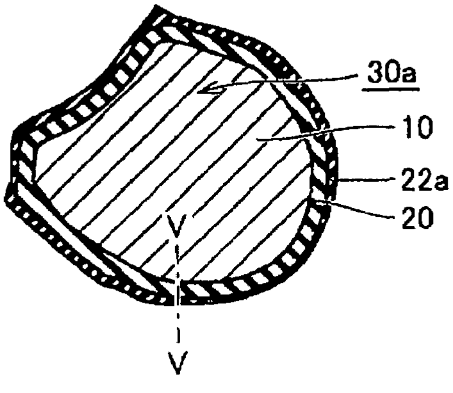
FIG. 4B is an enlarged view showing a single composite magnetic particle shown in FIG. 4A.

FIG. 4A is an enlarged schematic view showing a dust core according to a second embodiment of the present invention. FIG. 4B is an enlarged view showing a single composite magnetic particle shown in FIG. 4A. Referring to FIGS. 4A and 4B, in a soft magnetic material of this embodiment, the structure of the composite coating of composite magnetic particles 30*a* is different from that of the first embodiment. A composite coating 22*a* of this embodiment is a mixed coating including a heat-resistance-imparting protective coating and a flexible protective coating. More specifically, for example, the composite coating 22*a* of this embodiment is a composite coating in which molecules of a silicone resin having a siloxane crosslinking density (R/Si) of more than 0 and not more than 1.5 and molecules of a silicone resin having a siloxane crosslinking density (R/Si) of more than 1.5 are mixed.

In addition, the content of the flexible protective coating contained in the composite coating 22*a* is increased from the composite coating 22*a* located at the boundary with the insulating coating 20 toward the surface of the composite coating 22*a*. Accordingly, on the surface of the composite coating 22*a*, the content of the flexible protective coating is higher than the content of the heat-resistance-imparting protective coating. In addition, in the composite coating 22*a* located at the boundary with the insulating coating 20, the content of the heat-resistance-imparting protective coating is higher than the content of the flexible protective coating.

Figure 5:
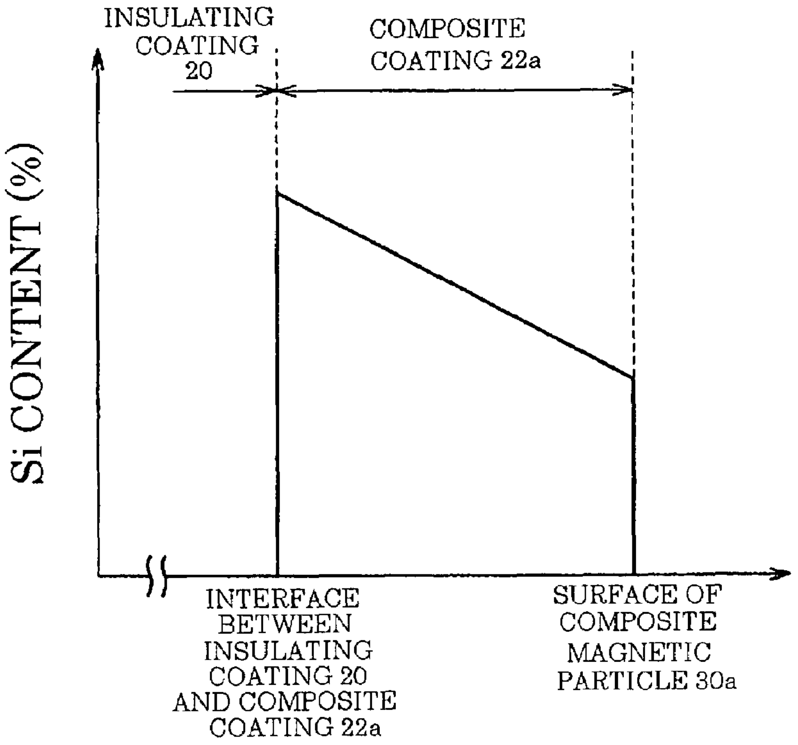
FIG. 5 is a graph showing the Si content along line V-V in a composite coating of the composite magnetic particle shown in FIG. 4B.

In the composite magnetic particle 30*a* shown in FIGS. 4A and 4B, the Si content in the composite coating 22*a* is shown, for example, in FIG. 5.

FIG. 5 is a graph showing the Si content along line V-V in the composite coating of the composite magnetic particle shown in FIG. 4B. Referring to FIG. 5, the siloxane crosslinking density (R/Si) of the flexible protective coating contained in the composite coating 22*a* is higher than the siloxane crosslinking density (R/Si) of the heat-resistance-imparting protective coating contained in the composite coating 22*a*. Therefore, the Si content is monotonically decreased from the composite coating 22*a* located at the boundary with the insulating coating 20 toward the surface of the composite coating 22*a*. Accordingly, on the surface of the composite coating 22*a*, the content of the flexible protective coating is higher than the content of the heat-resistance-imparting protective coating. In addition, in the composite coating 22*a* located at the boundary with the insulating coating 20, the content of the heat-resistance-imparting protective coating is higher than the content of the flexible protective coating.

An example of a method of forming the above composite coating 22*a* on the surface of the insulating coating 20 is a method of immersing the metal magnetic particles 10 having the insulating coating 20 in an organic solvent in which a component of the heat-resistance-imparting protective coating is dissolved and stirring the mixture, and vaporizing the organic solvent while a component of the flexible protective coating is gradually dissolved in the organic solvent. In this method, the component of the heat-resistance-imparting protective coating first covers the surface of the insulating coating 20, and the content of the component of the heat-resistance-imparting protective coating is decreased in the organic solvent. On the other hand, the content of the component of the flexible protective coating is increased in the organic solvent. Consequently, the composite coating 22*a* in which the content of the component of the flexible protective coating is increased stepwise can be prepared.

The structure of the soft magnetic material and the method of producing the soft magnetic material other than the above description are almost similar to those of the soft magnetic material described in the first embodiment. Therefore, the same components are assigned the same reference numerals, and a description of those components is omitted.

According to the soft magnetic material of this embodiment, since the flexible protective coating having a predetermined flexibility is present in a larger amount on the surfaces of the composite magnetic particles 30*a*, a satisfactory compactibility can be provided. In addition, since the flexible protective coating is present in a larger amount on the surfaces of the composite magnetic particles 30*a*, the flexible protective coating contained in the composite coating 22*a* can prevent the phenomenon in which the heat-resistance-imparting protective coating contained in the composite coating 22*a* and the insulating coating 20 are broken by a pressure applied during pressure molding. Accordingly, the insulating coating 20 can satisfactorily function, thereby sufficiently reducing eddy currents flowing between the particles.

Furthermore, since the heat-resistance-imparting protective coating is present in a larger amount on the boundary with the insulating coating, the insulating coating 20 is protected by the heat-resistance-imparting protective coating. Consequently, heat resistance of the insulating coating 20 is improved, and the insulating coating 20 is not readily broken even when a heat treatment is performed at a high temperature. Accordingly, the hysteresis loss can be reduced by the high-temperature heat treatment.

In this embodiment, a description has been made of the case where the Si content in the composite coating 22*a* has a distribution shown in FIG. 5. However, the present invention is not limited thereto as long as, on the surface of the composite coating, the content of the flexible protective coating is higher than the content of the heat-resistance-imparting protective coating, and in addition, in the composite coating located at the boundary with the insulating coating, the content of the heat-resistance-imparting protective coating is higher than the content of the flexible protective coating.

Examples of the present invention will be described below.

Example 1

In this example, compactability of a soft magnetic material of the present invention was examined. First, dust core samples of the present invention and Comparative Examples 1 to 3 were prepared by a method described below.

Sample of the present invention: An iron powder (ABC 100.30 (from Höganäs AB)) produced by an atomizing method with a purity of 99.8% or higher was prepared as metal magnetic particles 10. An insulating coating 20 was then formed by a phosphate conversion treatment. A coating of a low-molecular-weight silicone resin (XC96-B0446 manufactured by GE Toshiba Silicones Co., Ltd.) having a thickness of 50 nm was then formed as a heat-resistance-imparting protective coating 24. Furthermore, a coating of a high-molecular-weight silicone resin (TSR116 manufactured by GE Toshiba Silicones Co., Ltd.) having a thickness of 50 nm was then formed as a flexible protective coating 26. Subsequently, the particles were maintained at a temperature of 150° C. for one hour in air to cure the heat-resistance-imparting protective coating 24 and the flexible protective coating 26 under heating. Thus, a plurality of composite magnetic particles 30 were obtained. The mixed powder was then molded under a pressure in the range of 7 to 13 t (ton)/cm$^2$ (686 to 1,275 MPa) to prepare a dust core (sample of the present invention).

Comparative Example 1

The insulating coating 20 was formed on the surfaces of the metal magnetic particles 10 by the same method as that of the sample of the present invention. Subsequently, only a heat-resistance-imparting protective coating made of the low-molecular-weight silicone resin (XC96-B0446 manufactured by GE Toshiba Silicones Co., Ltd.) was formed so as to have a thickness of 100 nm. Subsequently, a dust core (Comparative Example 1) was prepared by the same method as that of the sample 1 of the present invention.

Comparative Example 2

The insulating coating 20 was formed on the surfaces of the metal magnetic particles 10 by the same method as that of the sample of the present invention. Subsequently, only a flexible protective coating made of the high-molecular-weight silicone resin (TSR116 manufactured by GE Toshiba Silicones Co., Ltd.) was formed so as to have a thickness of 100 nm. Subsequently, a dust core (Comparative Example 2) was prepared by the same method as that of the sample 1 of the present invention.

Comparative Example 3

The insulating coating 20 was formed on the surfaces of the metal magnetic particles 10 by the same method as that of Comparative Example 1. A coating containing the low-molecular-weight silicone resin (XC96-B0446 manufactured by GE Toshiba Silicones Co., Ltd.) and 0.2 mass percent of $SiO_2$ nanoparticles (average particle diameter: 30 nm) serving as a pigment was then formed so as to have a thickness of 100 nm. Subsequently, a dust core (Comparative Example 3) was prepared by the same method as that of the sample 1 of the present invention. Comparative Example 3 corresponded to the iron-based powder described in Patent Reference 1.

The compact densities of the dust cores thus prepared were measured. The results are shown in Table I and FIG. 6.

TABLE I

| Surface pressure [ton/cm$^2$] | The present invention | Comparative example 1 | Comparative example 2 | Comparative example 3 |
|---|---|---|---|---|
| 7 | 7.36 | 7.23 | 7.42 | 7.18 |
| 9 | 7.54 | 7.38 | 7.58 | 7.31 |
| 11 | 7.65 | 7.51 | 7.67 | 7.46 |
| 13 | 7.71 | 7.56 | 7.72 | 7.55 |

Figure 6:
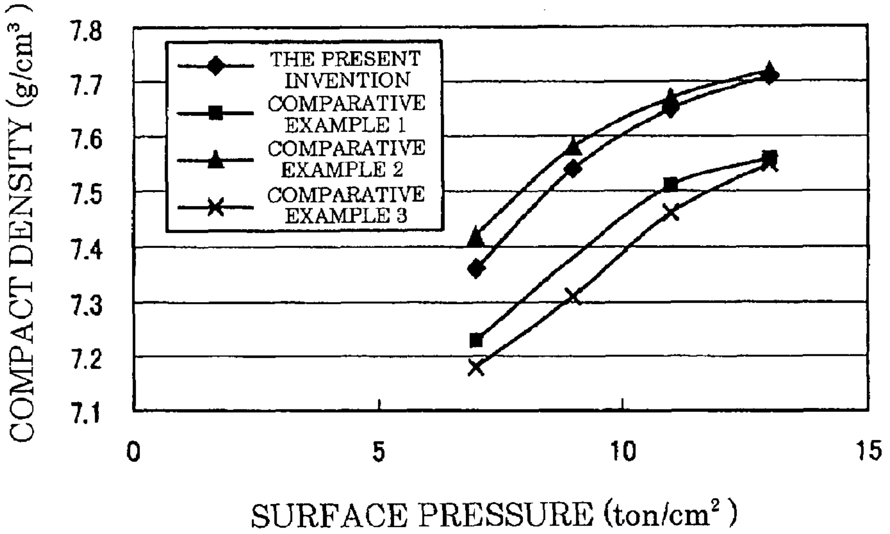
FIG. 6 is a graph showing the relationship between the surface pressure during pressure molding and the compact density in Example 1 of the present invention.

Referring to Table I and FIG. 6, for example, when the surface pressure was 7 t/cm$^2$ (686 MPa), the compact density of the dust core of the present invention was 7.36 g/cm$^3$ and the compact density of Comparative Example 2 was 7.42 g/cm$^3$, whereas the compact density of Comparative Example 1 was 7.23 g/cm$^3$ and the compact density of Comparative Example 3 was 7.18 g/cm$^3$. When the surface pressure was 9 t/cm$^2$ (883 MPa), 11 t/cm$^2$ (1,079 MPa), and 13 t/cm$^2$ (1,275 MPa), the compact densities of the dust core of the present invention and that of Comparative Example 2 were higher than those of Comparative Examples 1 and 3. These results showed that the dust cores of the present invention and Comparative Example 2 had a satisfactory compactibility.

Example 2

In this example, heat resistance of an insulating coating and the core loss (eddy-current loss and hysteresis loss) of a soft magnetic material of the present invention were examined. More specifically, dust cores of the present invention and Comparative Examples 1 to 3 were prepared by the same method as that in Example 1 at a pressure during the pressure molding of 11 t/cm$^2$ (1,079 MPa). The dust cores (compacts) were then annealed. In this annealing step, the annealing temperature was varied in the range of 400° C. to 800° C. Subsequently, the core loss of each dust core was measured. The results are shown in Table II and FIG. 7. In the measurement of the core loss, the excitation flux density was 10 kG (kilogauss) and the measurement frequency was 1,000 Hz.

TABLE II

| Annealing [° C.] | The present invention | Comparative example 1 | Comparative example 2 | Comparative example 3 |
|---|---|---|---|---|
| 400 | 174 | 196 | 182 | 275 |
| 450 | 144 | 173 | 155 | 219 |
| 500 | 126 | 156 | 132 | 182 |
| 550 | 104 | 142 | 121 | 149 |
| 600 | 95 | 131 | 111 | 132 |
| 650 | 88 | 119 | 158 | 119 |
| 700 | 86 | 115 | 266 | 109 |
| 750 | 86 | 116 | 1,050 | 156 |
| 800 | 129 | 166 | Could not be measured. | 207 |
| 850 | 189 | 206 | Could not be measured. | 282 |

Figure 7:
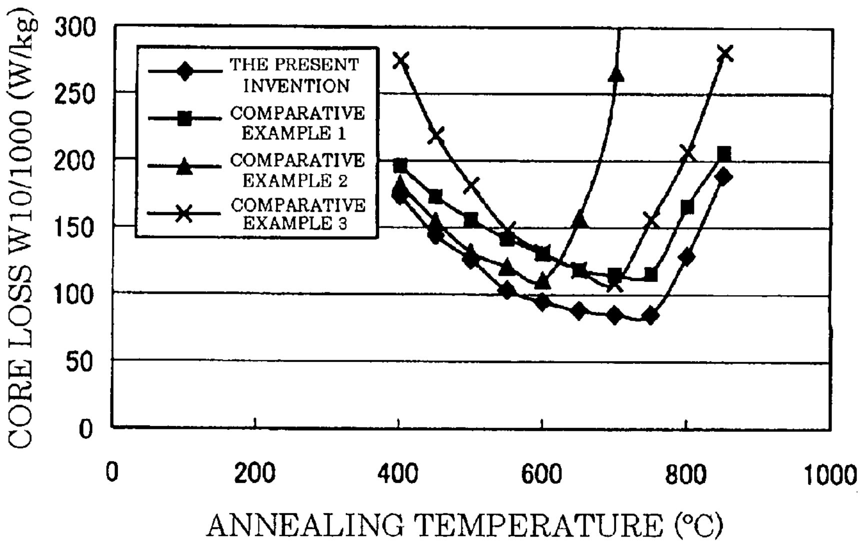
FIG. 7 is a graph showing the relationship between the annealing temperature and the core loss in Example 2 of the present invention.

Referring to Table II and FIG. 7, for example, when the annealing temperature was 450° C., the core loss of the dust core of the present invention was 144 W/kg, whereas the core loss of Comparative Example 1 was 173 W/kg, the core loss of Comparative Example 2 was 155 W/kg, and the core loss of Comparative Example 3 was 219 W/kg. The core loss of the dust core of the present invention was also smaller than that of Comparative Examples 1 to 3 at other annealing temperatures.

In the dust cores of the present invention and Comparative Examples 1 to 3, the core loss had a minimum, and when the annealing temperature exceeded a certain temperature, the core loss was increased. This is because thermal decomposition of the insulating coating was initiated by annealing, thereby increasing the eddy-current loss. In the dust core of the present invention, the temperature at which the core loss became the minimum was in the range of 700° C. to 750° C. In contrast, the temperatures at which the core loss became the minimum were 700° C. in Comparative Example 1, 600° C. in Comparative Example 2, and 700° C. in Comparative Example 3. These results showed that the insulating coating of the dust core of the present invention had a high heat resistance, and the core loss (eddy-current loss and hysteresis loss) of the dust core of the present invention could be sufficiently reduced.

Table III shows performance of the dust cores of the present invention and Examples 1 to 3 produced in Comparative Examples 1 and 2. In Table III, A represents "excellent", B represents "somewhat excellent", C represents "somewhat poor", and D represents "poor".

TABLE III

| | Compactibility | Heat resistance |
|---|---|---|
| The present invention | B | A |
| Comparative example 1 | C | B |
| Comparative example 2 | B | D |
| Comparative example 3 | C | B |

Referring to Table III, in Comparative Example 1, heat resistance was somewhat excellent, but compactibility was degraded. In Comparative Example 2, compactibility was excellent, but heat resistance was degraded. In Comparative Example 3, heat resistance was somewhat excellent, but compactibility was degraded. In contrast, in the dust core of the present invention, both compactibility and heat resistance were excellent.

It should be understood that the embodiments and examples disclosed herein are illustrative in all points and not restrictive. The scope of the present invention is defined by the claims rather than by the description preceding them; it is intended to include all variations falling within the meaning and scope equivalent to the scope of the claims.

The invention claimed is:

1. A soft magnetic powder comprising a plurality of composite magnetic particles, wherein each of the plurality of composite magnetic particles includes a metal magnetic particle, an insulating coating covering the surface of the metal magnetic particle, and a composite coating covering the outside of the insulating coating, the composite coating includes a heat-resistance-imparting protective coating covering the surface of the insulating coating, and a flexible protective coating covering the surface of the heat-resistance-imparting protective coating, the heat-resistance-imparting protective coating comprises an organic silicon compound, and the siloxane crosslinking density of the organic silicon compound is more than 0 and not more than 1.5, and the flexible protective coating is made of a silicone resin, wherein a siloxane crosslinking density of the silicone resin is more than 1.5.

2. The soft magnetic powder according to claim 1, wherein the insulating coating comprises at least one compound selected from the group consisting of a phosphorus compound, a silicon compound, a zirconium compound, and an aluminum compound.

3. The soft magnetic powder according to claim 1, wherein the average thickness of the insulating coating is in the range of 10 nm to 1 μm.

4. The soft magnetic powder according to claim 1, wherein the average thickness of the composite coating is in the range of 10 nm to 1 μm.

5. A dust core comprising:

a soft magnetic powder comprising a plurality of composite magnetic particles, wherein each of the plurality of composite magnetic particles includes a metal magnetic particle, an insulating coating covering the surface of the metal magnetic particle, and a composite coating covering the outside of the insulating coating, the composite coating includes a heat-resistance-imparting protective coating covering the surface of the insulating coating, and a flexible protective coating covering the surface of the heat-resistance-imparting protective coating, the heat-resistance-imparting protective coating comprises an organic silicon compound, and the siloxane crosslinking density of the organic silicon compound is more than 0 and not more than 1.5, and the flexible protective coating is made of a silicone resin, wherein a siloxane crosslinking density of the silicone resin is more than 1.5.

6. The dust core according to claim 5, wherein the Si content of the composite coating located at the boundary with the insulating coating is higher than the Si content on the surface of the composite coating.

7. A soft magnetic powder comprising a plurality of composite magnetic particles, wherein each of the plurality of composite magnetic particles includes a metal magnetic particle, an insulating coating covering the surface of the metal magnetic particle, and a composite coating covering the surface of the insulating coating;

the composite coating is a mixed coating including a heat-resistance-imparting protective coating and a flexible protective coating;

on the surface of the composite coating, the content of the flexible protective coating is higher than the content of the heat-resistance-imparting protective coating;

in the composite coating located at the boundary with the insulating coating, the content of the heat-resistance-imparting protective coating is higher than the content of the flexible protective coating, the heat-resistance-imparting protective coating comprises an organic silicon compound, and the siloxane crosslinking density of the organic silicon compound is more than 0 and not more than 1.5, and the flexible protective coating is made of a silicone resin, wherein a siloxane crosslinking density of the silicone resin is more than 1.5.

8. The soft magnetic powder according to claim 7, wherein the insulating coating comprises at least one compound selected from the group consisting of a phosphorus compound, a silicon compound, a zirconium compound, and an aluminum compound.

9. The soft magnetic powder according to claim 7, wherein the average thickness of the insulating coating is in the range of 10 nm to 1 μm.

10. The soft magnetic material powder according to claim 7, wherein the average thickness of the composite coating is in the range of 10 nm to 1 μm.

11. A dust core comprising:

a soft magnetic powder comprising a plurality of composite magnetic particles, wherein each of the plurality of composite magnetic particles includes a metal magnetic particle, an insulating coating covering the surface of the metal magnetic particle, and a composite coating covering the surface of the insulating coating;

the composite coating is a mixed coating including a heat-resistance-imparting protective coating and a flexible protective coating;

on the surface of the composite coating, the content of the flexible protective coating is higher than the content of the heat-resistance-imparting protective coating;

in the composite coating located at the boundary with the insulating coating, the content of the heat-resistance-imparting protective coating is higher than the content of the flexible protective coating, the heat-resistance-imparting protective coating comprises an organic silicon compound, and the siloxane crosslinking density of the organic silicon compound is more than 0 and not more than 1.5, and the flexible protective coating is made of a silicone resin, wherein a siloxane crosslinking density of the silicone resin is more than 1.5.

12. The dust core according to claim 11, wherein the Si content of the composite coating located at the boundary with the insulating coating is higher than the Si content on the surface of the composite coating.

* * * * *

UNITED STATES PATENT AND TRADEMARK OFFICE

CERTIFICATE OF CORRECTION

PATENT NO. : 7,544,417 B2
APPLICATION NO. : 11/795463
DATED : June 9, 2009
INVENTOR(S) : Toru Maeda et al.

It is certified that error appears in the above-identified patent and that said Letters Patent is hereby corrected as shown below:

In Claim 10, column 16, line 29, the word "material" should be omitted.

Signed and Sealed this

Twentieth Day of October, 2009

David J. Kappos

David J. Kappos
*Director of the United States Patent and Trademark Office*